(12) United States Patent
Manvel (10) Patent No.: US 10,467,818 B2
(45) Date of Patent: Nov. 5, 2019

(54) SYSTEM AND METHOD FOR VIRTUAL WARDROBE SELECTION

(71) Applicant: Marie Manvel, Marina del Rey, CA (US)

(72) Inventor: Marie Manvel, Marina del Rey, CA (US)

(*) Notice: Subject to any disclaimer, the term of this patent is extended or adjusted under 35 U.S.C. 154(b) by 0 days.

(21) Appl. No.: 15/994,014

(22) Filed: May 31, 2018

(65) Prior Publication Data
US 2018/0350151 A1 Dec. 6, 2018

Related U.S. Application Data

(60) Provisional application No. 62/512,949, filed on May 31, 2017.

(51) Int. Cl.
| G06T 19/00 | (2011.01) |
| G06T 19/20 | (2011.01) |
| G06F 16/51 | (2019.01) |
| H04N 5/232 | (2006.01) |

(52) U.S. Cl.
CPC ............ *G06T 19/006* (2013.01); *G06F 16/51* (2019.01); *G06T 19/20* (2013.01); *G06T 2200/24* (2013.01); *G06T 2219/2012* (2013.01); *G06T 2219/2016* (2013.01); *G06T 2219/2021* (2013.01); *H04N 5/23296* (2013.01)

(58) Field of Classification Search
None
See application file for complete search history.

(56) References Cited

U.S. PATENT DOCUMENTS

| 4,926,344 A | 5/1990 | Collins et al. |
| 5,495,568 A | 2/1996 | Beavin |
| 5,530,652 A | 6/1996 | Croyle et al. |
| 5,557,527 A | 9/1996 | Kotaki et al. |
| 5,850,222 A | 12/1998 | Cone |
| 6,196,429 B1 | 3/2001 | Cavdek et al. |
| 6,307,568 B1 | 10/2001 | Rom |
| 6,968,075 B1 | 11/2005 | Chang |
| 8,189,000 B2 | 5/2012 | Weaver |
| 2014/0035913 A1* | 2/2014 | Higgins ................. G06T 17/00 345/420 |

(Continued)

OTHER PUBLICATIONS

Author unknown, "How to rotate Kinect sensor", published before Feb. 26, 2014, retrieved on Jun. 3, 2019 from https://social.msdn.microsoft.com/forums/en-US/954197e5-a0df-44d3-84f4-9bf3885deead/how-to-rotate-kinect-sensor.*

(Continued)

*Primary Examiner* — Zhengxi Liu
(74) *Attorney, Agent, or Firm* — Leason Ellis LLP (57) ABSTRACT

A system, a method and a computer program are provided to assist a user in virtually trying on and selecting a wardrobe article that may belong to the user, or that may be available from another source. The system, method and computer program display a real-world image of the wardrobe article on the user, so that the user may determine the real-world look and fit of the article on the user, including how the article would look and fit with respect to other items worn by the user, thereby minimizing any need for the wearer to actually try on an article to determine how the article will actually fit and look on the wearer, or how the article will look with respect to other articles worn by the wearer.

19 Claims, 7 Drawing Sheets

(56) References Cited

U.S. PATENT DOCUMENTS

| | | |
|---|---|---|
| 2014/0279192 A1 | 9/2014 | Selby |
| 2014/0310304 A1 | 10/2014 | Bhardwaj et al. |
| 2015/0282714 A1* | 10/2015 | Mueller ............... A61B 90/30 348/37 |
| 2017/0148089 A1* | 5/2017 | Murzin ............. G06Q 30/0643 |

OTHER PUBLICATIONS

Allen Chan, "Motorized magnetic selfie stick with bluetooth remote control shutter button", published on May 30, 2016, retrieved from https://www.youtube.com/watch?v=i0GBjJLCwqA on Sep. 23, 2019.*

Zhang, Wei, et al. "An intelligent fitting room using multi-camera perception." Proceedings of the 13th international conference on Intelligent user interfaces. ACM, 2008.

* cited by examiner

SYSTEM AND METHOD FOR VIRTUAL WARDROBE SELECTION

CROSS-REFERENCE TO PRIOR APPLICATION

This application claims priority to and the benefit thereof from U.S. Provisional Patent Application No. 62/512,949, filed May 31, 2017, titled "System and Method for Virtual Wardrobe Selection," the entirety of which hereby incorporated herein by reference.

FIELD OF THE DISCLOSURE

The present disclosure relates to a system, a method and a computer program for a simulating a person wearing clothing, shoes, gloves, hats, hairstyles, hair colors, makeup, accessories, and/or the like; and, more particularly, assisting the person in selecting any one or more of the foregoing.

BACKGROUND OF THE DISCLOSURE

According to a Jul. 9, 2009 article in The Telegraph, the average woman may spend almost a year of her life deciding what to wear. The article noted that "[c]hoosing outfits for work, nights out, dinner parties, holidays, gym and other activities means the average female will spend 287 days rifling through their wardrobe." The article further noted that "[t]he biggest chunk of that time is used up picking a killer ensemble for Friday or Saturday nights out or selecting the right clothes for a holiday." And, for those women that have wardrobes that are significantly larger than that of the average woman, they may spend significantly more than 287 days of their lives trying on and selecting the right clothing to wear.

There exists an unfulfilled need for a system, a method and a computer program for assisting a person in selecting clothing, shoes, accessories, and the like to wear by allowing the person to virtually try on items, or combinations of items, or match a particular set or single item.

SUMMARY OF THE DISCLOSURE

According to non-limiting examples of the disclosure, a system, a method, and a computer readable medium are provided herein. The system, method and computer program may be provided to assist a user in virtually trying on and selecting a wardrobe article that may belong to the user, or that may be available from another source. The system, method and computer program display a real-world image of the wardrobe article on the user, so that the user may determine the real-world look and fit of the article on the user, including how the article would look and fit with respect to other items worn by the user, thereby minimizing any need for the wearer to actually try on an article to determine how the article will actually fit and look on the wearer, or how the article will look with respect to other articles worn by the wearer.

Additional features, advantages, and embodiments of the disclosure may be set forth or apparent from consideration of the detailed description and drawings and attachment. Moreover, it is to be understood that the foregoing summary of the disclosure and the following detailed description, drawings and attachment are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description and attachment serve to explain the principles of the disclosure. No attempt is made to show structural details of the disclosure in more detail than may be necessary for a fundamental understanding of the disclosure and the various ways in which it may be practiced. In the drawings.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 1:
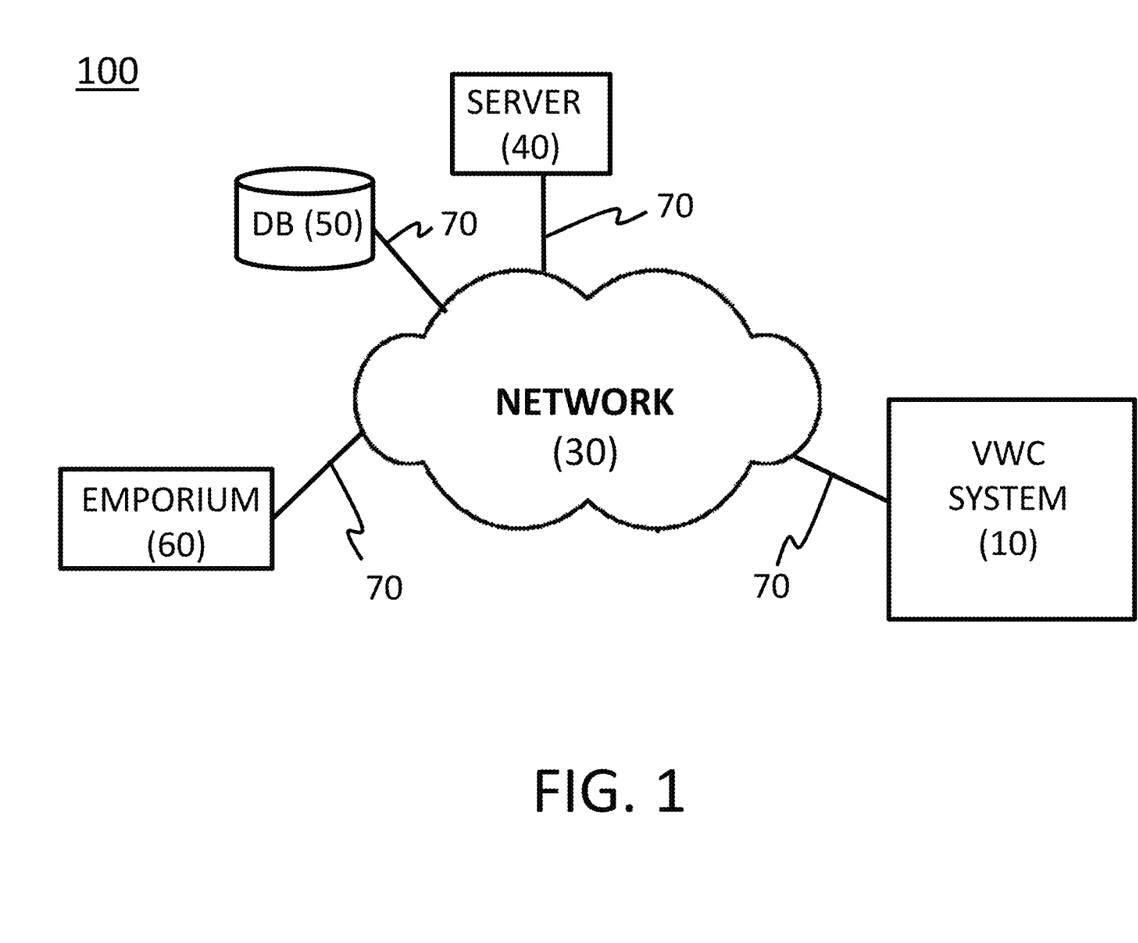
FIG. 1 shows an example of a virtual wardrobe system, according to the principles of the disclosure.

FIG. 1 shows an example of a virtual wardrobe system 100, according to the principles of the disclosure. The virtual wardrobe system 100 includes a virtual wardrobe capture (VWC) system 10 and a network 30. The virtual wardrobe system 100 may include a server 40, a database 50, and an emporium 60. Each of the components 10, 30, 40, 50, and 60 may be communicatively coupled via one or more communication links 70. Each of the components 10, 30, 40, 50 and 60 may include one or more computers, each of which may be communicatively coupled through a communication link 70. The VWC system 10 may include a module suite 500 (shown in FIG. 7). Alternatively, the module suite 500 may be included in the server 40. The module suite 500, which is described in greater detail below, may include an image processor module 510, a clothing module 520, a make-up module 530, an accessories module 540, a hair style module 550, a footwear module 560, and a display module 570.

Figure 2:
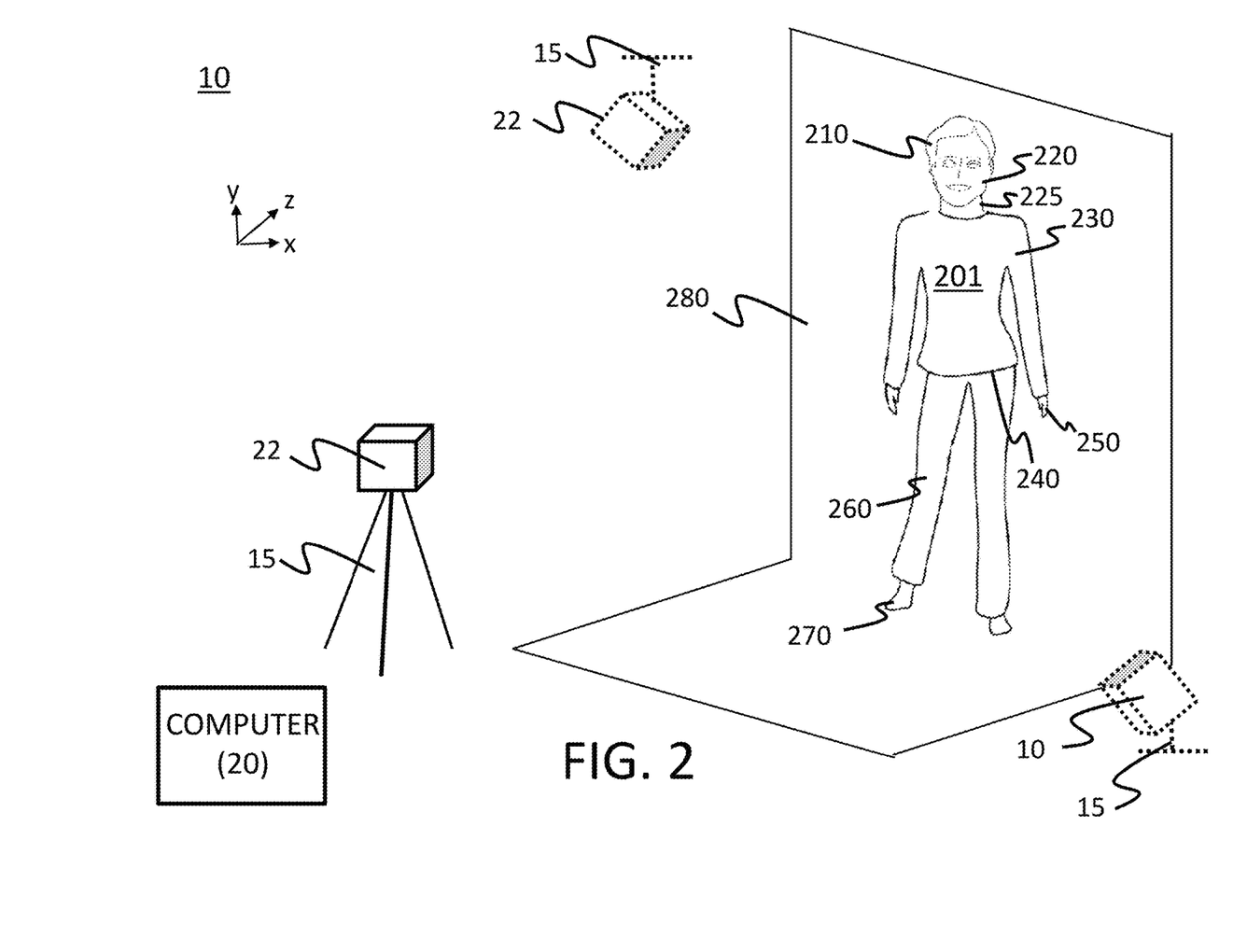
FIG. 2 shows an example of a virtual wardrobe capture system, according to the principles of the disclosure.

FIG. 2 shows an example of VWC system 10, according to the principles of the disclosure. The VWC system 10 includes an image pickup device 22, such as, for example, a camera, a mobile phone, a computer tablet, a charge-coupled device (CCD), or any other device, as known by those skilled in the art, that may capture an image of a subject 201 and convert the captured image into an image signal that may be stored in a storage device, such as, for example, a memory 410 (shown in FIG. 4) or the database 50 (shown in FIG. 1), or transmitted to and displayed on a display device (not shown). The VWC system 10 may be configured to process and store captured images. Images that are captured by the VWC system 10 may be stored locally, or the images may be forwarded to the server 40 or database 50. The images may be transmitted to the image processor module 510 (shown in FIG. 7), which may be located in the VWC system 10 or the server 40.

The emporium 60 may include, for example, a computer located at, or belonging to a retail store or shop, an outlet store, a superstore, a megastore, a department store, a chain store, a manufacturer, a designer, a warehouse, an establishment, a virtual store, an online catalog, or the like. The emporium 60 may include a database (not shown) of image files that may be indexed and accessed to retrieve specific image files, including specific images. The image files may include images of clothing articles, accessories, footwear, hair styles, make-up, tattoos, and the like, which may be accessed and retrieved by the computer 20 or server 40.

Figure 7:
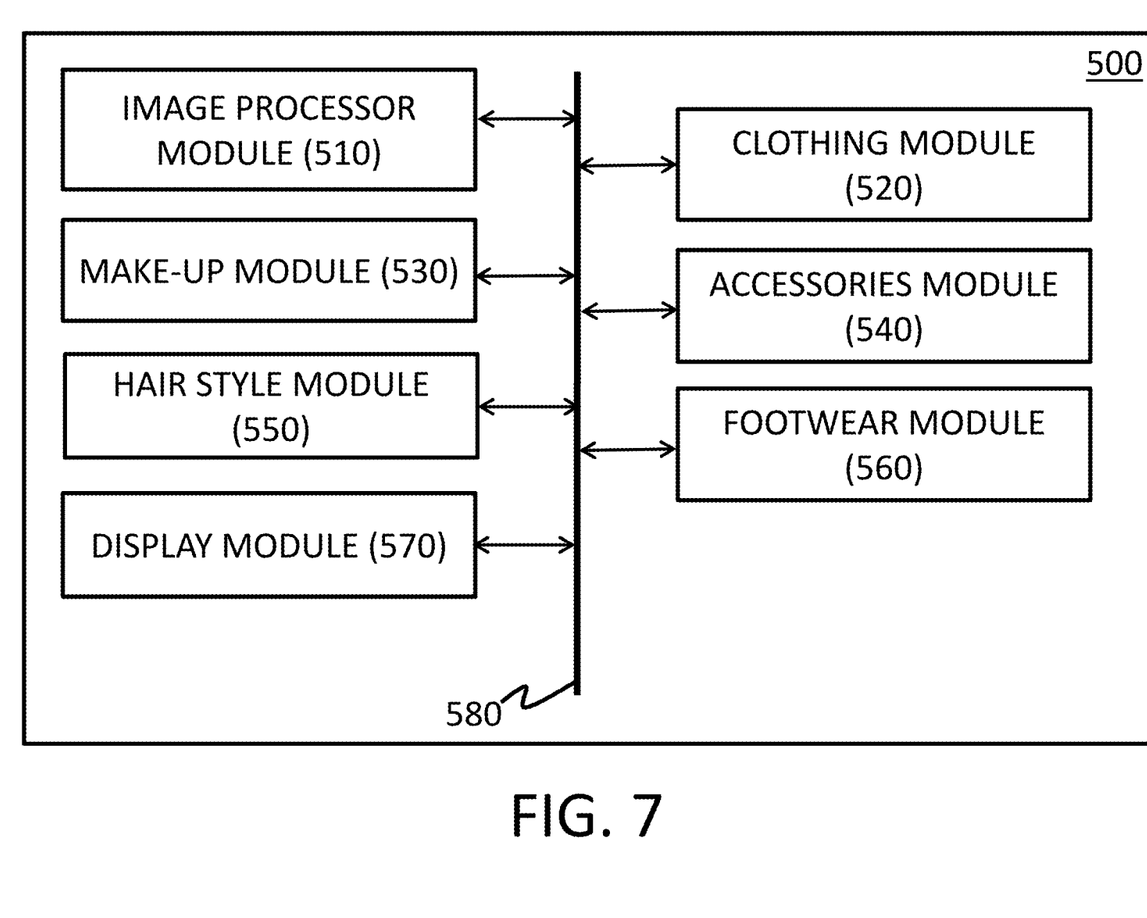
FIG. 7 shows an example of a module suite that may be included in the virtual wardrobe system of FIG. 1.

The VWC system 10 may operate under control of the image processor module 510 (shown in FIG. 7). Each of the components in the VWC system 10 may communication via a communication link 70 (not shown in FIG. 2). The VWC system 10 includes a computer 20 and the image pickup device 22, which may be mounted to a support 15. The support 15 may include, for example, a tripod, a ceiling mount, a floor mount, a wall mount, or the like, to position and hold the image pickup device 22 in a desired position. The VWC system 10 may include one or more additional image pickup devices 22, each of which may be supported by a support 15. The VWC system 10 may include a greenscreen 280 (or bluescreen, or the like).

The support 15 may include a stationary support that is configured to fixedly and securely hold the image pickup device 22 in a desired position. Alternatively, or additionally, the support 15 may include a dynamic support that moveably holds the image pickup device 22. The dynamic support 15 may be configured to rotate and/or pivot about one or more of the x-, y- and z-axis, thereby providing 360° rotational and angular positioning. The dynamic support 15 may be communicatively coupled via a communication link 70 (not shown in FIG. 2) to the image pickup device 22 or computer 20. The dynamic support 15 may be controlled to capture an image of the subject 201 or a particular portion of the subject 201. The dynamic support may include, for example, one or more stepping motors that may be controlled by, e.g., the image processor module 510 (shown in FIG. 7).

Figure 3:
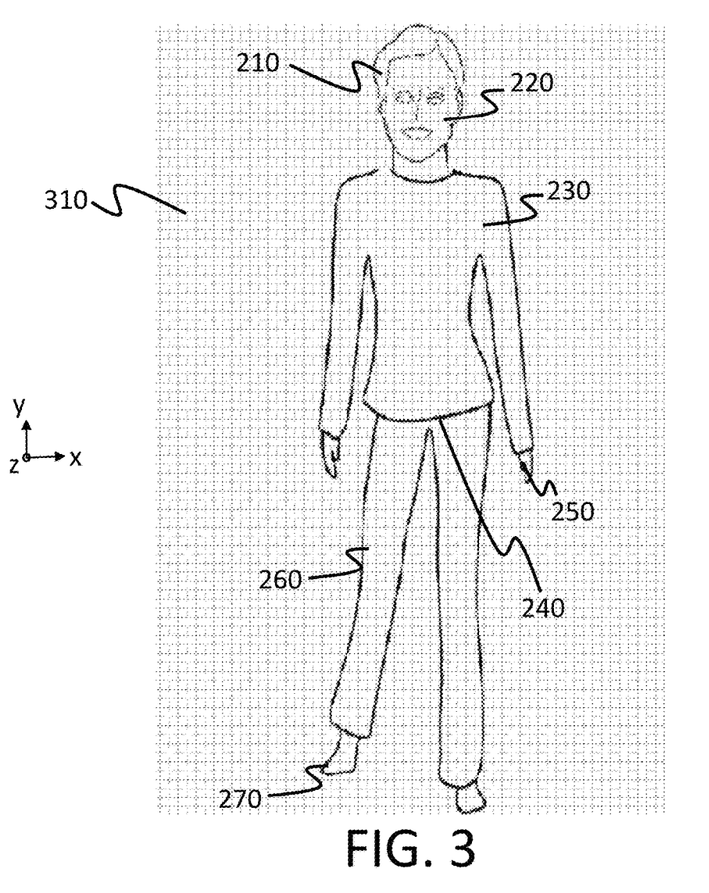
FIG. 3 shows an example of a captured image.

FIG. 3 shows an example of a captured image 310, according to an aspect of the disclosure.

Referring to FIGS. 2 and 3, the image pickup device(s) 22 may be positioned to target and capture an image 310 of the entire subject 201, or any portion thereof. For instance, the image pickup device(s) 22 may be controlled to focus (in or out), zoom (in or out), and/or selectively capture an image of the subject's hair 210, head 220, neck 225, top 230, mid-portion 240, hands 250, bottom 260, and/or feet 270. The positioning, focusing, and/or zooming may be carried out electronically by means of, for example, software in the image pickup device 22 or image processor module 510 (shown in FIG. 7), as understood by those skilled in the art, and/or mechanically by means of the support 15. For example, the image pickup device(s) 22 may be directed toward and target (electronically and/or mechanically) the left hand 250 of the subject 201 to capture an image of the hand. The image pickup device(s) 22 may target a hand accessory (e.g., a glove, a bracelet, a ring, a watch, a tattoo, a nail polish, or the like) that the subject 201 may be wearing on the left hand 250. The image pickup device(s) 22 may be directed toward and target the right hand 250 and capture an image of the hand, as well as any hand accessory that the subject 201 may be wearing. The image pickup device 22 may be directed toward and target any other portion of the subject 201 and capture a corresponding image of the portion of the subject 201, including accessories. By positioning and operating multiple image pickup devices 22 substantially simultaneously, as seen in FIG. 2, a three-dimensional image may be captured for each portion of the subject 201, which may provide a 360° view of each portion of the subject 201, including the subject 201 as a whole.

The images captured by the image pickup device(s) 22 may be stored in the image pickup device(s) 22 and/or transmitted, for example, to the computer 20 and/or database 50 (shown in FIG. 1). The captured images may be transmitted directly via a communication link 70, or over the network 30 (shown in FIG. 1). The captured images may be automatically tagged with an image identifier by, for example, the image pickup device(s) 22 or by a user via a user interface (not shown), which may be provided in or on the image pickup device(s) 22 or computer 20 (e.g., a keyboard, a mouse, an alphanumeric pad displayed on a smartphone, a touch-screen, or the like). The image identifier may include a wardrobe category, a brand category, a season category, an activity category, an ambiance category, and the like.

The wardrobe category may include, for example, a hair subcategory, a head subcategory, a neck subcategory, a top-portion subcategory, a mid-portion subcategory, a hand subcategory, a bottom-portion subcategory, and a feet subcategory. The brand category may include a name brand (e.g., "Loui Vuitton," "Chanel," "Burberry," "Nike," "Adidas," or the like), a production year, a product name, a product SKU, or the like.

The season category may include "Winter," "Spring," "Summer," and "Fall." The season category may include a weather subcategory. The weather subcategory may include "Rain," "Sun," "Snow," "Sleet," "Windy," "Freezing," "Cold," "Warm," "Hot," "Cloudy," "Hazy," "Overcast," "Humid," "Dry," and the like.

The activity category may include "Yoga," "ZUMBA," "Aerobics," "Running," "Swimming," "Hiking," "Biking," "Golf," and the like The ambiance category may include "Breakfast," "Brunch," "Lunch," "Dinner," "Party," "Gathering," "Formal," "Casual," "Business Casual," "Business," ""Beach," "Park," "City," "Country," and the like. The ambiance category may include a lighting subcategory, which may include "Dark," "Light," and the like, and a time-of-day subcategory, which may include "Morning," "Afternoon," "Evening," and the like.

The hair subcategory may include, for example, a hair style type (e.g., beehive, "Marylyn Monroe," "Jacqueline Kennedy," or the like, or a label provided by the user), a hair color (e.g., blonde, brunette, redhead, brunette with blond streaks, brunette with pink streaks, or the like), a hair length (e.g., "No Hair," very short, short, medium, long, very long, or the like), a hair accessory type (e.g., a hat, a bonnet, a crown, or the like), a hair accessory name, a hair accessory color, and the like.

The head subcategory may include a makeup brand name, a makeup type (e.g., eyeshadow, eyeliner, foundation, blush, lipstick, and the like), a makeup color, a makeup texture, and the like. The head subcategory may include an ear accessory. The ear accessory may include an earring name, an earring brand name, an earring type, earmuffs, and the like.

The neck subcategory may include "Necklace," "Charm," "Scarf," "Cravat," "Tie," and the like. The neck subcategory may include an accessory type. The accessory type may include an accessory name, a color, a brand name, a material type (e.g., pearl, diamond, gold, silver, costume jewelry, or the like), and the like.

The top-portion subcategory may include "Blouse," "Coat," "Jacket," "Dress," "Overcoat," "Shirt," "Under-Shirt," "Bra," "Top," and the like. The top-portion subcategory may include a top-portion accessory. The top-portion accessory may include an accessory type (e.g., "Pin," "Broach," and the like).

The mid-portion subcategory may include "Belt," "Band," and the like.

The hand subcategory may include "Glove type," "Glove," "Bracelet," "Nail Polish," "Color," "Ring Type," "Ring," "Watch Type," "Watch," "Tattoo," and the like.

The bottom-portion subcategory may include "Pant," "Skirt," "Bottom," "Dress," "Short," "Bikini," and the like.

The feet subcategory may include a shoe type (e.g., "Boots," "Heels," "Flats," and the like), a shoe color, a foot accessory (e.g., ankle bracelet, toe ring, nail polish type, nail polish color, nail polish texture, and the like), and the like.

As those having ordinary skill in the art will understand, other identifiers may be included without departing from the scope or spirit of the disclosure, including additional identifiers for each of the wardrobe category, the brand category, the season category, and the ambiance category.

Figure 4:
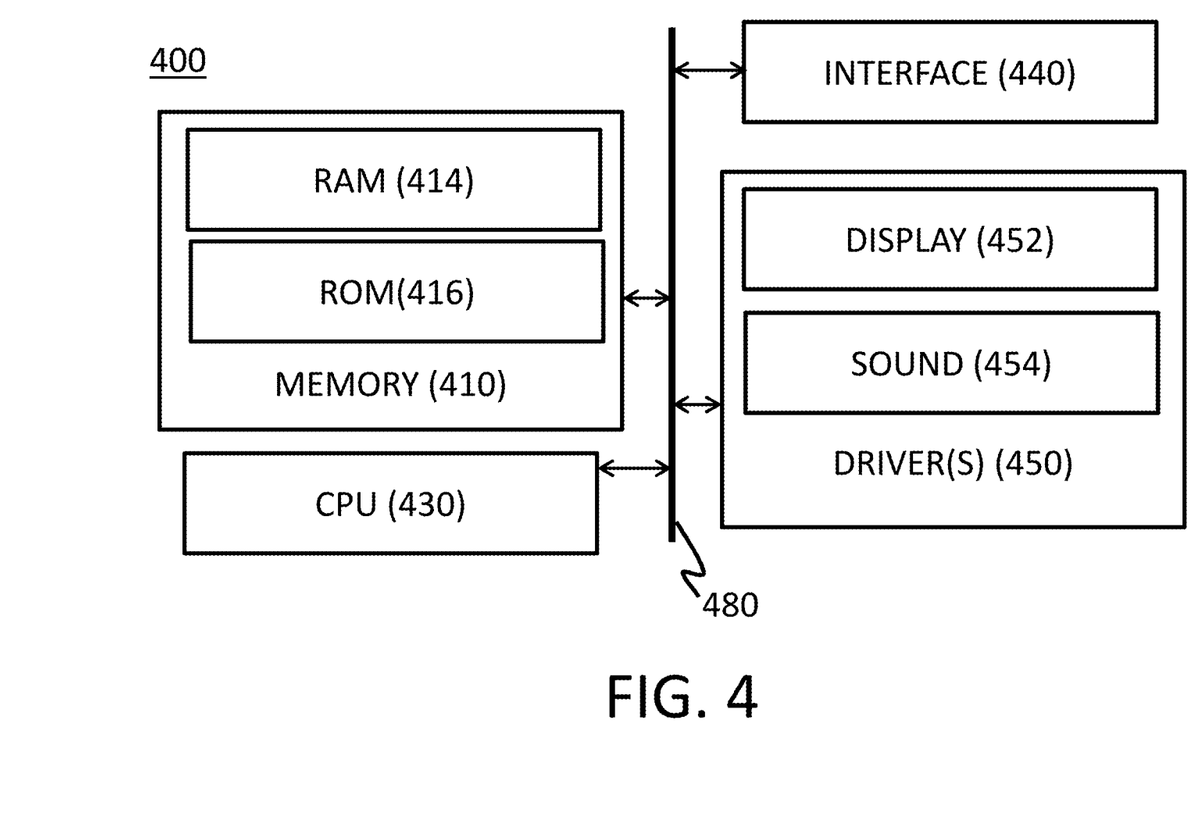
FIG. 4 shows an example of an image processor that may be included in the virtual wardrobe capture system of FIG. 2.

FIG. 4 shows an example of an image processor 400 that may be included in the VWC system 10. The image processor 400 may be provided in the image processor module 510 (shown in FIG. 7). The image processor 400 includes a memory 410, a central processing unit (CPU) 430, an interface 440, and a driver suite 450, each of which may be connected to a bus 480 via a communication link. The memory 410 may include a random access memory (RAM) 414 and a read only memory (ROM) 416. The driver suite 450 may include a display driver 452 and a sound driver (454). The memory 420 may include a computer readable medium.

The interface 440 may include a graphic user interface (GUI), a human user interface (HUI), or the like. The interface 440 may be configured to receive data signals and instruction signals from a user via, for example, a keyboard (not shown), a mouse (not shown), a touchscreen (not shown), a microphone (e.g., voice command), and the like.

The driver suite 450 may include the display driver 452, the audio driver 454, a video card (not shown), a sound card (not shown), an x-y-z-axis servo-motor driver (not shown), a lens-focus driver (not shown), a lens-zoom driver (not shown), or the like. The x-y-z-axis servo-driver may be configured to operate, e.g., one or more servo-motors in the support(s) 15 (shown in FIG. 2) to direct the image pickup device 22 and target one or more portions of the subject 201 (shown in FIG. 2). The lens-focus driver may be configured to drive and focus-in or focus-out the image pickup device 22. The lens-zoom driver may be configured to drive and zoom-in or zoom-out the image pickup device 22. The image pickup device 22 may include autofocus and/or autozoom software that uses, for example, edge detection, as is known in the art, to focus and/or adjust scale the image to be captured.

Figure 5:
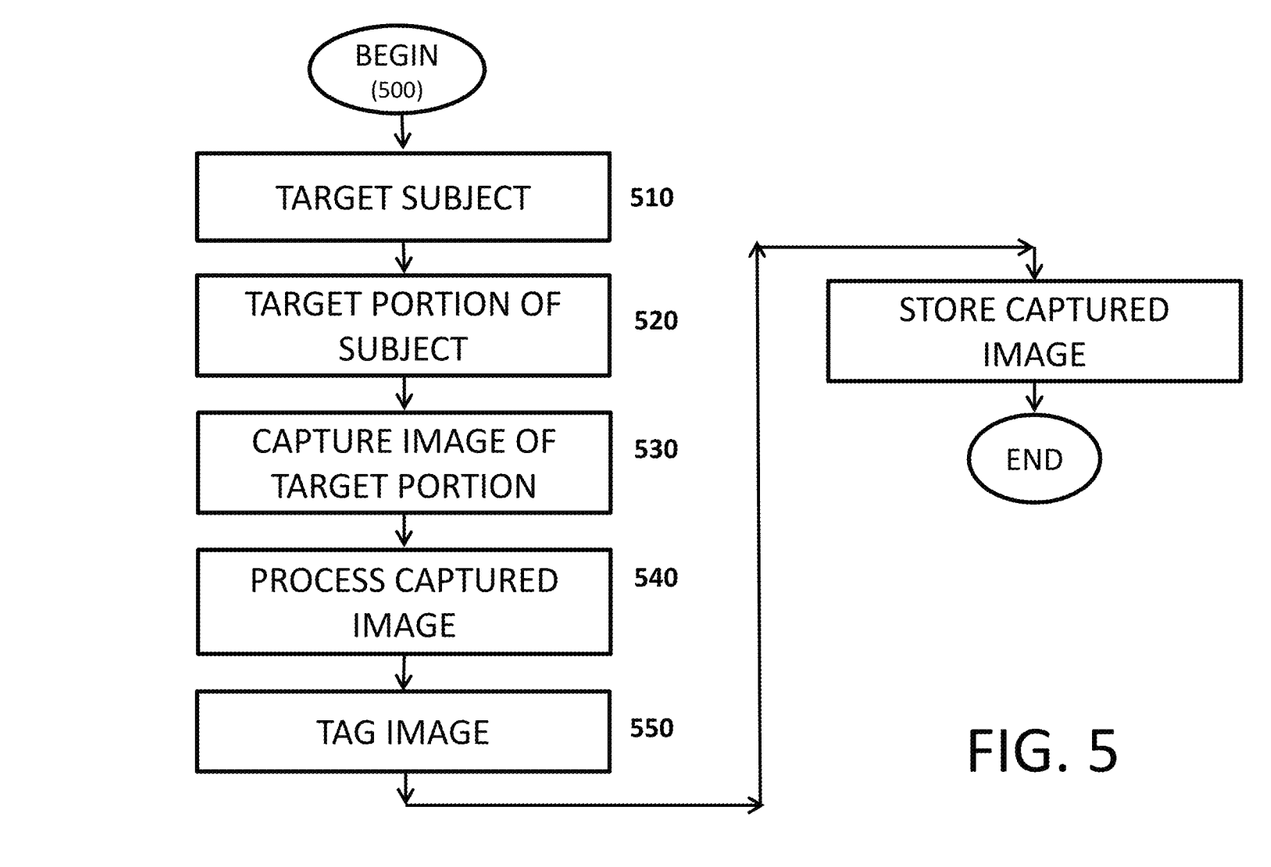
FIG. 5 shows an example of a virtual wardrobe capture process, wherein the process may be carried by the virtual wardrobe capture system of FIG. 2.

FIG. 5 shows an example of a virtual wardrobe capture (VWC) process 500, which may be carried out by the VWC system 10 (shown in FIG. 2). According to a non-limiting embodiment of the disclosure, a computer program may be stored in and executed by the image processor module 510 (shown in FIG. 7) to carry out the process 500. The computer program may include one or more sections of computer code for each of the steps in the virtual wardrobe capture process 500.

Referring to FIGS. 2 and 5, the process 500 may include setting up the greenscreen 280, such as, for example, by driving one or more motors (not shown) and/or one or more actuators (not shown). One or more image pickup devices 22 may be positioned and directed to capture an image of the subject 201 (Step 510). The image pickup device(s) 22 may be adjusted (electronically and/or mechanically) to target a particular portion of the subject 201 (e.g., 210, 220, 225, 230, 240, 250, 260, or 270, in FIG. 2) for image capture (Step 520). In this regard, the image pickup device(s) 22 may be moved in the x-, y-, and/or z-axis, focused in/out, and/or zoomed in/out.

For a three dimensional image, panoramic, multi-view, or 360° image of the portion of the subject, two or more image pickup devices 22 may be positioned to capture different (and potentially overlapping) views of the portion of the subject to be captured. For instance, one image pickup device 22 may be positioned in front of the subject 201 and a second image pickup device 22 may be positioned behind and above the subject 201, so that it is adjacent to (with possible overlapping) and positioned to capture a field of view that is outside that of the first image pickup device 22, thereby allowing for substantially 360° image capture.

The image pickup device(s) 22 may be operated to capture the image of the targeted portion of the subject 201 (Step 530). The image pickup device(s) 22 may be operated automatically according to a pre-programmed routine (e.g., stored in memory 410 (shown in FIG. 4) or image processor module 510 (shown in FIG. 7), or by a user using a user interface (e.g., GUI, keypad, keyboard, remote control, mobile phone, or the like, not shown). The user interface (not shown) may be communicatively coupled to the interface 440, shown in FIG. 4.

The pre-programmed routine may include, for example, a computer program provided in the image processor module 510 (shown in FIG. 7) that includes computer-executable instructions to operate the image pickup devices 22 (and/or supports 15) to target and capture an image of one or more of the portions 210, 220, 225, 230, 240, 250, 260, 270 of the subject 201. The targeting of the image may include focusing in/out, zooming in/out, moving the field of image capture of the image pickup device(s) 22, any of which may be carried out electronically or mechanically.

When targeting portions of the subject 201 (Step 530) to capture an image of the targeted portion, the subject 201 may wear a greenscreen body suit (not shown) and only the article of clothing, accessory, footwear, or the like. The subject 201 may wear a greenscreen head cover and/or gloves (not shown). The body suit may be configured to cover the entire body, neck, hands, feet, and/or feet, so as to allow for subsequent image capture of distinct portions of the subject 201, including any articles (e.g., accessories), or the like. The captured image of the greenscreen body suit (with or without wearables) may be stored as a reference image that may be subsequently used to adjust and match size, shape, orientation (including angular and planar orientation), texture, or the like of clothing, accessories, footwear, hairstyles, or the like, to the user's body, so that the resultant image will accurately and realistically depict how the clothing, accessory, footwear, hairstyle, or the like, will look on the individual. The captured image of the greenscreen body suit may include three-dimension coordinates, so that the user's body may be accurately depicted in three-dimension and accurately matched to clothes, accessories, footwear, hairstyles, or the like, so as to create an accurate three-dimensional image of the user wearing the matched clothes, accessories, footwear, hairstyle, or the like.

Referring to FIG. 3, the captured image of the portion of the subject 201 may be processed to determine article attributes for the article captured in the portion of the subject 201 (Step 540). For instance, using a plurality of data points in the x-y (and, optionally, z-) plane, an accurate and scaled representation of the article (e.g., a red blouse in the top-portion 230) may be determined, including x, y (and, optionally, z) coordinates for each of a plurality of data points on the article. For a three-dimensional image, the determined attributes may include x, y, z coordinates for each of the plurality of data points of an aggregate 3-D image captured by multiple image pickup devices 22. The article attributes may be used at a later time to scale the captured image of the article to match an associated body portion of a wearer of any shape or size, so as to virtually and accurately display the wearer wearing the article with a proper fit and form for the wearer's size and shape.

Additionally, an edge detector (not shown) may be included in the image pickup device(s) 22 or image processor module 510 (shown in FIG. 7) to detect edges of the captured image, so as to process the captured image to remove any portions that may not belong to the captured image. The edge detector may include a high-pass filter (HPF), as is known by those skilled in the art. When processing the captured image of a glove, for example, the edge detector may identify an edge of the glove, so as to remove any portion (e.g., arm) of the subject 201 that extends beyond the glove.

The captured image may be tagged with an image identifier (Step 550), which may include, as noted above, a wardrobe category, a brand category, a season category, an activity category, an ambiance category, and the like. The captured image may be stored in a local memory (e.g., memory 410, shown in FIG. 4) and/or in a remotely located memory (e.g., database 50, shown in FIG. 1) (Step 560). The captured image may be stored together with the image identifier, which may include metadata. The captured image may be indexed according to the image identifier. For instance, "a red blouse" article for the top-portion 230 may be indexed as "Summer," "Business," "Work," "Blouse," "Blouse and/or Shirt," Blouse and/or Top," and "Red."

Referring to FIG. 7, the module suite 500, which may include the image processor module 510, clothing module 520, make-up module 530, accessories module 540, hairstyle module 550, footwear module 560, and display module 570, may include a bus 580 to facilitate wired communication. Each of the modules in the module suite 500 may transceive (transmit and/or receive) signals via one or more communication links. The module suite 500 may include artificial intelligence (AI) case-based reasoning that may learn the user's habits, preferences, activities, and the like, over time and automatically match and recommend wardrobe articles based on information such as, for example, user characteristics, user preferences, type of activity, time of year, weather, time of day, and the like.

The image processor module 510 may include a color module (not shown). The color module may include a look-up-table (LUT) that may be referenced to identify and select colors for wardrobe articles to match other selected (or selectable) wardrobe articles the user may have identified. The color module may identify and recommend wardrobe articles based on user characteristics, such as, for example, hair color, eye color, skin tone, or the like, or user preferences, such as, for example, cool colors, warm colors, complementary colors, or the like.

The clothing module 520 is configured to communicate with the modules within the module suite 500, including the image processor module 510 and display module 570. The clothing module 520 may be configured to communicate with the memory 410 (shown in FIG. 4), database 50 (shown in FIG. 1), and/or the emporium 60 (shown in FIG. 1). The clothing module 520 may be configured to identify and retrieve image files of articles of clothing. The clothing module 520 may identify and match clothing articles to other wardrobe articles that are selected, or may be selected by the user. The clothing module 520 may communicate with the image processor module 510 to provide wardrobe articles to the image processor module 510.

The make-up module 530 is configured to communicate with the modules within the module suite 500, including the image processor module 510 and display module 570. The make-up module 530 may be configured to communicate with the memory 410 (shown in FIG. 4), database 50 (shown in FIG. 1), and/or the emporium 60 (shown in FIG. 1). The make-up module 530 may be configured to identify and retrieve make-up files, including images of the subject 201 with various types of make-up applied—such as, for example, different images of the subject with different shags of lip-stick, eye-shadow, blush, or the like. The make-up module 530 may identify and match different shades, colors, textures, etc., of make-up to wardrobe articles that are selected, or may be selected by the user. The make-up module 530 may communicate with the image processor module 510 to provide different make-up, including colors, shades, textures, designs, patterns, etc., to the image processor module 510. The make-up module 530 may include "Night," "Day," "Casual," "Formal," and the like modes, which can adjust the various characteristics of the make-up based on the mode, including adjustment to color, shade, texture, design, pattern, etc.

The accessories module 540 is configured to communicate with the modules within the module suite 500, including the image processor module 510 and display module 570. The accessories module 540 may be configured to communicate with the memory 410 (shown in FIG. 4), database 50 (shown in FIG. 1), and/or the emporium 60 (shown in FIG. 1). The accessories module 540 may be configured to identify and retrieve image files of accessories, such as, for example, jewelry, hair accessories, belts, hats, gloves, handkerchiefs, broaches, ties, cravats, scarfs, and the like. The accessories module 540 may identify and match accessories to wardrobe articles that are selected, or may be selected by the user. The accessories module 540 may communicate with the image processor module 510 to provide accessories to the image processor module 510.

The hairstyle module 550 is configured to communicate with the modules within the module suite 500, including the image processor module 510 and display module 570. The hairstyle module 550 may be configured to communicate with the memory 410 (shown in FIG. 4), database 50 (shown in FIG. 1), and/or the emporium 60 (shown in FIG. 1). The hairstyle module 550 may be configured to identify and retrieve image files of hairstyles, hair colors, and the like. The hairstyle module 550 may identify and match hairstyles, hair colors, and the like, to wardrobe articles that are selected, or may be selected by the user. The hairstyle module 550 may communicate with the image processor module 510 to provide hairstyles, hair colors, or the like, to the image processor module 510.

The footwear module 560 is configured to communicate with the modules within the module suite 500, including the image processor module 510 and display module 570. The footwear module 560 may be configured to communicate with the memory 410 (shown in FIG. 4), database 50 (shown in FIG. 1), and/or the emporium 60 (shown in FIG. 1). The footwear module 560 may be configured to identify and retrieve image files of articles of footwear. The footwear module 560 may identify and match footwear articles to wardrobe articles that are selected, or may be selected by the user. The footwear module 520 may communicate with the image processor module 510 to provide footwear articles to the image processor module 510.

Figure 6:
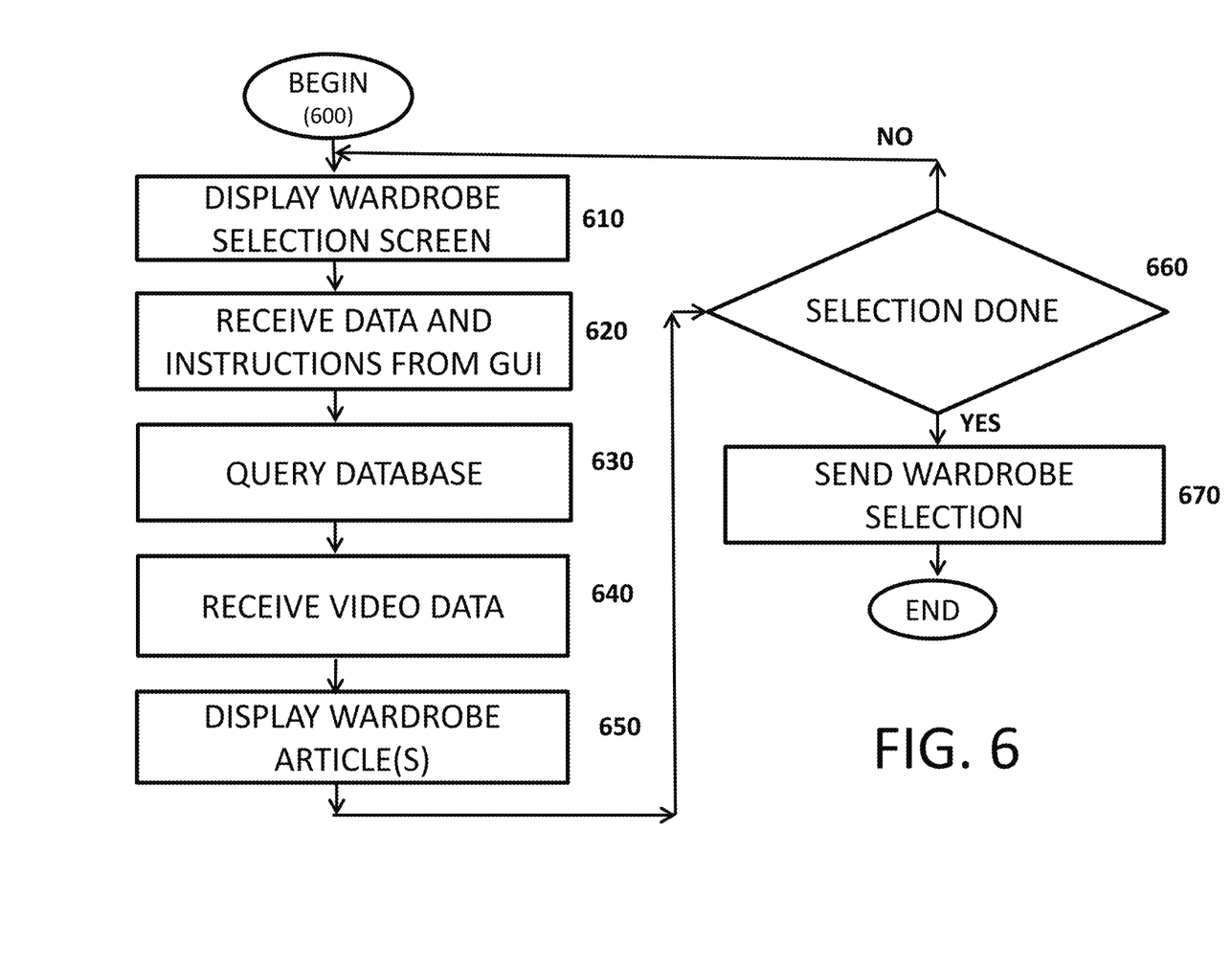
FIG. 6 shows an example of a virtual wardrobe display process, wherein the process may be carried out by the virtual wardrobe system of FIG. 1.

FIG. 6 shows an example of a virtual wardrobe display process 600, which may be carried out by the virtual wardrobe system 100 (shown in FIG. 1). For instance, the virtual wardrobe display process 600 may be carried out by the display module 570, shown in FIG. 7, which, as noted previously, may be located in the computer 20 or server 40 (shown in FIG. 1). According to a non-limiting embodiment of the disclosure, a computer program may be stored in and executed by the display module 570 to carry out the process 600. The computer program may include one or more sections of computer code for each of the steps in the virtual wardrobe display process 600.

Referring to FIGS. 1 and 6, the process 600 may begin by generating and displaying a display screen (not shown) on computer 20 (Step 610). The display screen may include a template with a plurality of data fields (not shown) that are configured to receive user inputs regarding one or more wardrobe articles to be tried by the user. The wardrobe articles may comprise all (or some) of the items belonging to the user, or items that may be available to the user (such as, e.g., from emporium 60, shown in FIG. 1). The items may include any item that may be worn by a user, including, clothing, jewelry, footwear, headwear, handwear, makeup, body paint, tattoos, and the like. The display screen may include an image (e.g., a digital photo) of the user, or a portion of the user (e.g., any one or more of the portions 210, 220, 225, 230, 240, 250, 260, 270, shown in FIG. 2). The data input by the user may include, for example, an image identifier, which may include, as noted above, a wardrobe category, a brand category, a season category, an activity category, an ambiance category, or the like.

The data input by the user may be received by, for example, via the user interface on the computer 20 and transmitted to the CPU 430 (shown in FIG. 4) (Step 620). On the basis of the received data signals, the CPU 430 may send instruction signals to a storage (e.g., the database 50, shown in FIG. 1, or memory 410 shown in FIG. 4) to query for image files corresponding to the data input by the user (Step 630). Corresponding image files may be located in and retrieved from the storage, and sent as an image signal to the image processor module 510 (shown in FIG. 7) (Step 640). The image signal, which may include a digital video signal comprising data packets, may be received by the image processor module (e.g., via interface 440, shown in FIG. 4) and displayed on the display device (not shown) of the computer 20 (Step 650).

The received image signal may be processed by the image processor module 510 to adjust and match attributes of the article(s) of wardrobe, accessories, footwear, hairstyle, and the like, of the subject 201, so as to provide a real-world look and fit on the subject, if the article(s), accessories, footwear, hairstyle, or the like, were actually worn by the subject. For instance, the image processor module 510 may adjust the width, height, length, texture, color, or the like, of a particular wardrobe article, so that it may display a realistic manifestation of how the wardrobe article would actually fit and appear on the wearer, thereby minimizing any need for the wearer to actually try on an article to determine how the article will fit, how the article will look on the wearer, how the article will look with respect to other articles worn by the wearer, and the like. This may be especially useful in the case of more permanent articles, such as, for example, tattoos, body paints, or the like.

A determination may be made regarding whether the user is done selecting wardrobe articles (Step 660). The determination may be made based on an instruction signal received from the user (e.g., via the interface 440, shown in FIG. 4), such as, e.g., selection of a radio-button, icon, link, spoken command, or the like, indicating "DONE," "FINISH," or the like (YES at Step 660), otherwise the user may be queried for browsing additional wardrobe articles (NO at Step 660) and the process may repeat (Step 610 through Step 660). A determination that the user is done selecting wardrobe articles (YES at Step 660) may be based on, for example, inactivity of the computer 20 (e.g., inactivity for 10 or more minutes). Wardrobe articles may include, but are not limited to, for example, a clothing article, an accessory, a hairstyle, a footwear article, a tattoo, body paint, make-up, or the like.

After a determination is made that the user is done selecting wardrobe articles (YES at Step 660), identification data for the selected wardrobe articles may be stored in a storage (e.g., database 50, memory 410, or the like) and/or transmitted to, for example, the emporium 60 to generate, e.g., a fill order, a purchase order, or the like, for the user. The emporium 60 may auto-fill the purchase order and send the wardrobe articles to the user by mail, carrier, or the like.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a mobile phone, a smart phone, or the like, or an array of processors, microprocessors, central processing units, general purpose computers, super computers, personal computers, laptop computers, palmtop computers, notebook computers, desktop computers, workstation computers, servers, or the like. A computer may include a computer cloud.

A "database," as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which may be configured to communicate data via a wireless and/or a wired communication medium.

A "selection link," as used in this disclosure, means any combination of software and/or hardware that receives an instruction or command from a user and sends an instruction signal to a computer to perform an action. A "selection link" may include, for example, a hyperlink, an embedded link, an icon, a radio button, a touch button, a cell on a touch display, a sound signal, a voice command, or the like.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation. The server may include a computer cloud.

The terms "including," "comprising," and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed is:

1. A simulation system that displays a real-world composite image of an article and a subject, the system comprising:
    an image pickup device that captures an image of the subject and converts the captured image to an image signal;
    a support that holds the image pickup device in a desired position;
    an image storage that stores a plurality of image files, including an image file having an image of the article;
    an image processor that
        receives the image file and the image signal, synthesizes the image of the article in the image file with the image of the subject in the image signal to form the composite image, and generates a display signal that includes the composite image; and a display that displays the composite image, wherein the image processor determines a plurality of data points for the image of the subject and adjusts a plurality of associated data points of the image of the article to form the composite image, wherein the composite image comprises a scaled representation of the image of the article matched in shape and size to the image of the subject, wherein the support comprises a dynamic support that moveably holds the image pickup device and is rotatable and pivotable about one or more axes, wherein the dynamic support is communicatively coupled to the image pickup device to position the image pickup device so that a desired portion of the subject is located in a field of view of the image pickup device, and wherein the image pickup device comprises a mobile phone and the dynamic support is controlled electronically via the mobile phone to position the mobile phone to capture the image of the subject.

2. The simulation system according to claim 1, wherein the image processor includes a module suite that comprises at least one of:
   a color module;
   a clothing module;
   a make-up module;
   an accessory module;
   a hair style module;
   a footwear module; and
   a display module.

3. The simulation system according to claim 2, wherein the module suite adjusts one or more of a width, a height, a shape, a length, a texture, and a color of the article to fit the article on the subject.

4. The simulation system according to claim 2, wherein the color module identifies and selects one or more colors in the image of the article.

5. The simulation system according to claim 2, wherein the clothing module communicates with the image storage to identify and retrieve one or more image files and identify one or more additional images of articles based on an image identifier.

6. The simulation system according to claim 5, wherein the image identifier includes at least one of a wardrobe category, a brand category, a season category, an activity category, and an ambiance category.

7. The simulation system according to claim 1, wherein the article comprises a clothing article, an accessory, a footwear article, a hair style, a make-up article, or a tattoo.

8. The simulation system according to claim 1, wherein the image signal is tagged with an image identifier.

9. The simulation system according to claim 1, wherein the image storage stores the image of the subject and the image processor retrieves the image of the subject from the image storage.

10. A method for displaying a real-world composite image of an article and a subject, the method comprising:
    receiving an image signal from an image pickup device that captures an image of the subject;
    receiving a selection signal from a user interface that identifies an image of an article stored in an image storage;
    retrieving an image file from the image storage that includes the identified image of the article;
    identifying a plurality of data points on the image of the subject;
    determining an associated plurality of data points on the image of the article;
    adjusting the associated plurality of data points on the image of the article to match the plurality of data points on the image of the subject in shape and size to form the composite image; and
    displaying the composite image,
    wherein the composite image comprises a scaled representation of the image of the article matched in shape and size to the image of the subject,
    wherein a support holds the image pickup device in a desired position,
    wherein the support comprises a dynamic support that moveably holds the image pickup device and is rotatable and pivotable about one or more axes,
    wherein the dynamic support is communicatively coupled to the image pickup device to position the image pickup device so that a desired portion of the subject is located in a field of view of the image pickup device, and
    wherein the image pickup device comprises a mobile phone and the dynamic support is controlled electronically via the mobile phone to position the mobile phone to capture the image of the subject.

11. The method according to claim 10, wherein the image of the article comprises a clothing article, an accessory, a footwear article, a hair style, a make-up article, or a tattoo.

12. The method according to claim 10, wherein said image file is tagged with an image identifier.

13. The method according to claim 12, wherein the image identifier includes at least one of a wardrobe category, a brand category, a season category, an activity category, and an ambiance category.

14. The method according to claim 10, wherein the composite image is a real-world look and fit of the article on the subject as if the article were actually worn by the subject.

15. The method according to claim 10, wherein the retrieving the image file from the image storage comprises identifying one or more additional images of articles based on an image identifier.

16. The method according to claim 15, wherein the image identifier includes at least one of a wardrobe category, a brand category, a season category, an activity category, and an ambiance category.

17. A simulation system that displays a real-world composite image of an article and a subject, the system comprising:
    an image pickup device that captures an image of the subject and converts the captured image to an image signal;
    a support that holds the image pickup device in a desired position;
    an image processor that
       receives the image signal and an image file from an image storage,
       synthesizes the image of the article in the image file with the image of the subject in the image signal to form the composite image, and
       generates a display signal that includes the composite image; and
    a display that displays the composite image,
    wherein the image processor determines a plurality of data points for the image of the subject and adjusts a plurality of associated data points of the image of the article to form the composite image, wherein the composite image comprises a scaled representation of the image of the article matched in shape and size to the image of the subject, wherein the support comprises a dynamic support that moveably holds the image pickup device and is rotatable and pivotable about one or more axes, wherein the dynamic support is communicatively coupled to the image pickup device to position the image pickup device so that a desired portion of the subject is located in a field of view of the image pickup device, wherein the image pickup device comprises a mobile phone and the dynamic support is controlled electronically via the mobile phone to position the mobile phone to capture the image of the subject.

18. The simulation system according to claim 17, wherein the image processor includes a module suite that comprises at least one of a color module, a clothing module, a make-up module, an accessory module, a hair style module, a footwear module, and a display module.

19. The simulation system according to claim 18, wherein the module suite adjusts one or more of a width, a height, a shape, a length, a texture, and a color of the article to fit the article on the subject.

* * * * *